L. HORSCHETZKY.
RESILIENT WHEEL.
APPLICATION FILED OCT. 3, 1921.

1,416,408.

Patented May 16, 1922.
2 SHEETS—SHEET 1.

Inventor
Louis Horschetzky

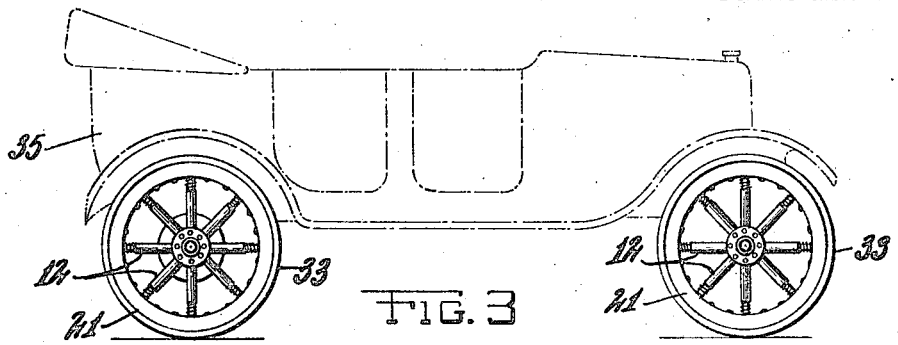
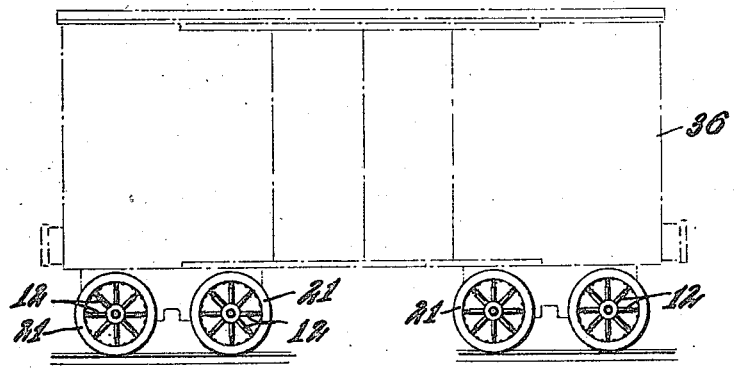
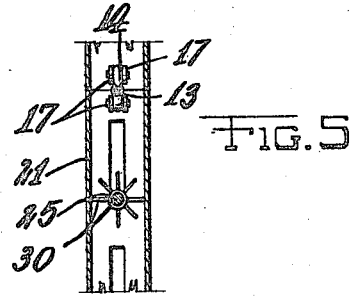

UNITED STATES PATENT OFFICE.

LOUIS HORSCHETZKY, OF NEW YORK, N. Y.

RESILIENT WHEEL.

1,416,408. Specification of Letters Patent. Patented May 16, 1922.

Application filed October 3, 1921. Serial No. 504,969.

*To all whom it may concern:*

Be it known that I, LOUIS HORSCHETZKY, a citizen of Hungary, residing at New York, in the county of New York and State of New York, have invented certain new and useful Improvements in Resilient Wheels, of which the following is a specification.

This invention relates generally to automobile or other vehicle wheels, having more particular reference to a resilient wheel.

The invention has for an object to provide a novel type of resilient wheel provided both with resilient spokes and a resilient rim structure.

For further comprehension of the invention, and of the objects and advantages thereof, reference will be had to the following description and accompanying drawings, and to the appended claims in which the various novel features of the invention are more particularly set forth.

Fig. 1 of the drawings is a side view, with parts in section, of a resilient wheel constructed according to the invention.

Fig. 3 is a side view showing an automobile equipped with my improved wheels.

Fig. 4 is a side view showing a rail-road car equipped with a modified form of wheel.

Fig. 5 is a detail fragmentary section on the line 5—5 of Fig. 1.

Figure 1:
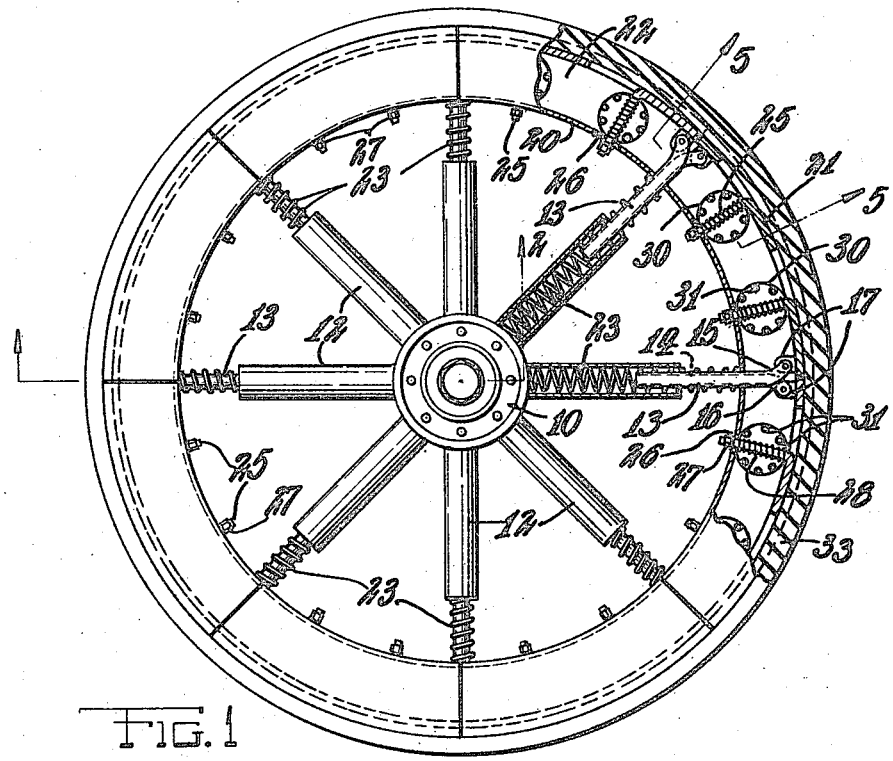
Figure 2:
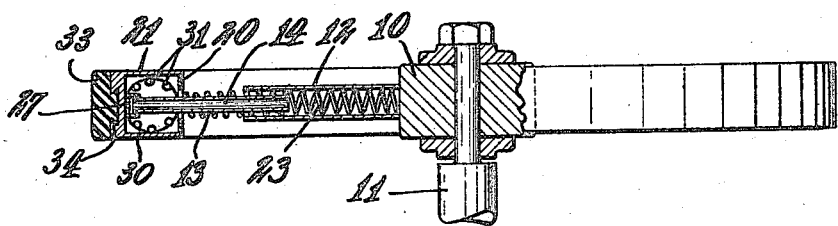
Fig. 2 is a part edge view and part sectional view on the line 2—2 of Fig. 1.

In constructing my improved wheel I provide a hub member 10 adapted to be mounted in the usual manner on the axle of the automobile, a portion of an axle being shown at 11 in Fig. 2.

Radiating from this hub is a series of fixed cylindrical spoke sections 12 having open outer ends. The spoke sections 12 have telescoping thereinto compound spoke sections connected at their outer ends to an outer sectional rim to be presently described in detail. These compound spoke sections comprise sleeves 13 and rods 14 slidable in the sleeves. The outer ends of the sleeves and rods are provided with offset ears 15 and 16 whereby they are pivotally attached to ears 17 formed on the meeting ends of adjacent sections of the outer sectional rim.

The rim of the wheel comprises a flat one-piece inner member 20 and an outer U-shaped rim divided circumferentially into a number of sections 21. The flanges of the sectional rim are turned inwardly and engage the flat inner rim 20 at their inner edges, forming an annular chamber 22. The cylindrical spoke elements 12 have seated therein coiled expansion spring 23 whose outer ends surround the sleeves 13 and bear on the inner rim member 20.

The sections of the outer rim have a resilient mounting on the inner rim and to this end each of the sections has a pair of fixed bolts 25 projecting radially inward therefrom, these bolts passing through circumferentially extended slots 26 in the inner rim 20 and having nuts 27 threaded on their inner ends. These bolts are surrounded by coiled expansion springs 28 which bear between the inner and outer rims.

Each bolt 25 has also grouped around it in spherical formation a series of circular springs 30 which bear between the inner and outer rims, these springs having a number of circular loops 31 formed therein and spaced evenly therearound, the number of loops in each spring being preferably the same as the number of sections in the outer rim.

When the wheel is intended for use on an automobile a rubber tire 33 is mounted thereon and may be held in place by a dovetail projection 34 on its inner face which engages in a complementary groove extending around the several rim sections.

In Fig. 3 of the drawings I have shown my improved wheel applied to an automobile the body whereof is indicated generally at 35.

As shown in Fig. 4 my improved wheel may be applied to a railroad car the body whereof is indicated at 36, in which case a steel tire of suitable shape is used.

It is believed that the manner of operation of my improved wheel will be readily understood from the above description, it being apparent that a double resilient effect is produced by the springs in the telescopic spokes and the springs bearing between the inner and outer rims.

While I have herein illustrated and described a preferred embodiment of the invention it is to be understood that I do not limit myself to the precise construction shown and the right is reserved to all changes and modifications that come within the spirit and scope of the appended claims.

Having thus described my invention what I claim as new and desire to protect by Let- ters Patent of the United States is as follows:

1. A wheel comprising separate inner and outer rims, spring elements bearing between said rims, and telescopic spokes passing freely through the inner rim and connected to the outer rim, the outer rim being divided into a series of separately movable sections to which said spokes are hinged.

2. A wheel comprising a hub, separate inner and outer rims, the outer rim being divided circumferentially into a series of sections, telescopic spokes radiating from said hub and comprising cylindrical members fixed to said hub and compound sleeve and rod members telescoping into said cylindrical members, said compound members passing freely through slots in the inner rim and having their respective parts hinged to the ends of adacent sections, springs seated in the said cylindrical spoke members and bearing outwardly against the said inner rim, and spring elements bearing between said rims.

3. In a wheel, outer and inner rim members, bolts fixed to the outer rim members and passing freely through the inner rim members, and coiled expansion springs surrounding said bolts and bearing between the outer and inner rim members.

4. In a wheel, outer and inner rim members, bolts fixed to the outer rim members and passing freely through the inner rim members, and coiled expansion springs surrounding said bolts and bearing between the outer and inner rim members, and nuts threaded on the inner ends of said bolts, and a series of circular springs grouped around each bolt and bearing between the two rims.

5. In a wheel, outer and inner rim members, the inner rim being continuous and the outer rim being divided circumferentially into a series of sections, a pair of bolts fixed to each of said sections and projecting radially inwardly through the inner rim, and spring devices grouped around said bolts and bearing between the inner and outer rims.

6. In a wheel, outer and inner rim members, the inner rim being continuous and the outer rim being divided circumferentially into the series of sections, a pair of bolts fixed to each of said sections and projecting radially inwardly through the inner rim, and spring devices grouped around said bolts and bearing between the inner and outer rims, said spring devices comprising a number of circular springs grouped in spherical formation, each of said springs having a number of loops formed therein, the number of loops in each spring corresponding to the number of sections in the outer rim.

In testimony whereof I have affixed my signature.

LOUIS HORSCHETZKY.